United States Patent [19]
Wakui et al.

[11] Patent Number: 5,497,467
[45] Date of Patent: Mar. 5, 1996

[54] VECTOR DATA BUFFER AND METHOD OF READING DATA ITEMS FROM A BANKED STORAGE WITHOUT CHANGING THE DATA SEQUENCE THEREOF

[75] Inventors: Fujio Wakui; Hirokatsu Fujiwara, both of Hadano; Yasutaka Yamada, Takamatsu, all of Japan

[73] Assignees: Hitachi, Ltd., Tokyo; Hitachi Computer Engineering Co., Ltd., Kanagawa, both of Japan

[21] Appl. No.: 742,832

[22] Filed: Aug. 8, 1991

[30] Foreign Application Priority Data

Aug. 8, 1990 [JP] Japan ..................... 2-210759

[51] Int. Cl.$^6$ ..................... G06F 13/10; G06F 12/00
[52] U.S. Cl. ............... 395/312; 395/497.02; 395/497.03; 395/800; 364/232.21; 364/239.3; 364/240.7; 364/245; 364/254; 364/DIG. 1
[58] Field of Search ..................... 364/200, 900; 395/425, 250, 400, 800, 312, 497.02, 497.03

[56] References Cited

U.S. PATENT DOCUMENTS

| | | | |
|---|---|---|---|
| 4,128,880 | 12/1978 | Cray, Jr. ..................... | 395/800 |
| 4,654,781 | 3/1987 | Schwartz et al. ..................... | 395/425 |
| 4,910,667 | 3/1990 | Tanaka et al. ..................... | 395/425 |
| 4,930,102 | 5/1990 | Jennings ..................... | 395/250 |
| 5,001,626 | 3/1991 | Kashiyama et al. ..................... | 395/800 |
| 5,070,444 | 12/1991 | Kubo et al. ..................... | 395/425 |
| 5,134,695 | 7/1992 | Ikeda ..................... | 395/400 |
| 5,367,654 | 11/1994 | Furukawa et al. ..................... | 395/425 |

FOREIGN PATENT DOCUMENTS 60-136849  7/1985  Japan .

*Primary Examiner*—Glenn Gossage
*Assistant Examiner*—Reginald Bragdon
*Attorney, Agent, or Firm*—Antonelli, Terry, Stout & Kraus

[57] ABSTRACT

A vector data processor includes a vector data buffer for receiving a plurality of arrayed data items requested from a storage including a plurality of storage banks (banks-0–3 in FIG. 2) for independent operations. The vector data buffer is constructed of a plurality of bank memories which conform to a corresponding periodic relationship between the arrayed data items and the storage banks. Date storing areas for storing the arrayed data items are preset on the successively different bank memories of the vector data buffer in the sequence in which the individual arrayed data items have been requested. The individual storage banks in the sequence in which the arrayed data items have been requested are respectively connected to the successively different bank memories, and the arrayed data items fetched from the individual storing banks are stored in the connected bank memories in succession.

5 Claims, 9 Drawing Sheets

VECTOR DATA BUFFER AND METHOD OF READING DATA ITEMS FROM A BANKED STORAGE WITHOUT CHANGING THE DATA SEQUENCE THEREOF

BACKGROUND OF THE INVENTION

1. Field of the Invention

The present invention relates to a vector data buffer device which is built into a vector data processor in order to store arrayed data items received from a storage area.

2. Description of the Related Art

Data transfer between a main storage and a buffer memory for storing a copy of the main storage data is usually performed in single-block units (where one block consists of, for example, 64 bytes), and the data is transferred between the same columns of the main store and the buffer memory.

The buffer memory also consists of a set of registers called an address array (index array or data directory), in which the numbers of blocks stored in the corresponding locations of the buffer memory are set. Since the blocks of consecutive numbers belong to different columns, the loads of the individual columns are ordinarily averaged. As a result, there is a 90% probability that a required block exists in the buffer memory.

However, in the case where the main storage area is divided into a plurality of modules, storage is accomplished by adopting a memory interleaving technique so that all the modules may operate in parallel, when dealing with consecutive addresses, to realize a data transfer rate a number-of-modules times faster.

In this regard, a recent storage controller has a plurality of instruction processors and input/output processors connected thereto in order to enhance the performance of the whole system, and the main storage area is provided with a large number of storing banks capable of operating independently of one another, in order to enhance the processing throughput thereof. In, for example, a vector computer, a plurality of processors are connected to one common main storage area, and the respective processors need to access the shared main storage and to fetch data at high speeds for the purpose of parallel processing.

Herein, in a case where the instruction processors numbers four, by way of example, and are connected to the main storage, this main storage is endowed with four ports in order to enhance the throughput thereof, and the respective ports operate independently of one another. From the viewpoint of one particular instruction processor, however, it is not at all certain that data items will be sent to the processor in the sequence of requests issued by that particular processor. More specifically, assuming that a particular processor has successively requested port-0 and port-1 to deliver data items, which of these ports will afford the data earlier is quite unknown. In the case where a vector computation or the like is allotted to and processed by the plurality of instruction processors, it forms an obstacle to the operation that data fetch sequences differ from the queues of arrayed data fetch requests issued by the instruction processors.

As an expedient method for storing such data items fetched from the storage area, in an operand buffer in the same sequence that the requests were issued, there has heretofore been, for example, a method disclosed in the official gazette of Japanese Patent Application Laid-open No. 60-136849. With the prior-art method, when the request is issued, information on the location of the buffer memory is affixed to this request, and when the data is fetched from the storage area and sent to the buffer memory, this information is also sent back, whereby the data is stored in the buffer memory on the basis of the location information.

In this method, however, logic corresponding to the number of the connected instruction processors need to be held on the storage side, so that the quantity of hardware increases significantly. More specifically, the information items relating to the locations of the buffer need to be carried about within the interval storage area in the number of the processors connected to the main storage. In recent storage systems, especially those having a large number of processors connected thereto, the quantity of hardware becomes enormous, thus rendering the method unfeasible.

SUMMARY OF THE INVENTION

An object of the present invention is to solve the problems of the prior art as stated above, and to provide a vector data buffer device which can guarantee the regular sequence of fetched arrayed data items without an appreciable increase in the quantity of hardware.

In order to accomplish the object, a data storing method according to the present invention consists of a method of storing data in a vector data buffer which receives a plurality of arrayed data items requested from a storage including a plurality of storage banks for independent operations and which stores the arrayed data items therein, comprising the steps of constructing the vector data buffer out of a plurality of bank memories which conform to a corresponding periodic relationship between the arrayed data items and the storage banks; presetting data storing areas for storing the arrayed data items, in the successively different bank memories of the vector data buffer in a sequence in which the individual arrayed data items have been requested; connecting the individual storage banks in the sequence in which the arrayed data items have been requested, to the successively different bank memories, respectively; and storing the arrayed data items fetched from the individual storage banks, in the connected bank memories in succession.

A vector data buffer device according to the present invention consists of a vector data buffer device which receives a plurality of arrayed data items from a storage including a plurality of storing banks for independent operation and which stores the arrayed data items therein, comprising a vector data buffer which includes a plurality of bank memories in a predetermined number based on the number of the storage banks, a data width of each of the storage banks, and a data width of each of the arrayed data items and which stores therein the arrayed data items fetched from the storage; switch device for connecting the individual bank memories of the vector data buffer to any desired one of the storing banks; switch control device for controlling connection relations of the switch device on the basis of, at least, a head address and data intervals of the arrayed data items; and storing address generator for generating address information items which indicate the bank memories of the data buffer to store the arrayed data items arriving from the individual storage banks, as well as entry addresses within the bank memories.

This vector data buffer device may well be so constructed that the number of the bank memories of data buffer is set to be n (integer) times larger than the number of the storage banks, while the data width of each storage bank is set to be n times larger than the data width of each bank memory, and that the n bank memories are simultaneously connected to each storage bank.

A vector data processor according to the present invention comprises a main storage which includes a plurality of storage banks, the aforementioned vector data buffer device which stores therein arrayed data items fetched from said main storage, arithmetic logic unit for successively deriving and processing the arrayed data items stored in the vector data buffer device, and a vector register which stores a processed result of the arithmetic logic unit therein.

The vector data buffer device may function also as said vector register.

In the present invention, the data widths of the arrayed data items and the head address and data intervals thereof are stored on the operand buffer side, and the means for generating the data storing address of each of the banks of the storage is also disposed in this side, whereupon the locations in the buffer for the arrayed data items fetched from the storage are quickly found. More specifically, the operand buffer is previously divided into a plurality of banks which conform to the corresponding periodic relations between the arrayed data items and the storing banks, and which are endowed with a regular sequence. Consequently, the buffer banks for storing the individual input data items are found from a head data address and an incremental value of data address on the main storage, and the input data items are successively stored in the corresponding buffer banks.

Thus, even when the regular sequence of the data items is not guaranteed among the storing banks, the buffer data items in the ensured regular sequence can be obtained. Moreover, since the increased hardware is essentially borne by the operand buffer side, the quantity of hardware on the storage side is hardly increased.

DESCRIPTION OF THE PREFERRED EMBODIMENTS

Now, embodiments of the present invention will be described in detail with reference to the drawings.

Figure 1:
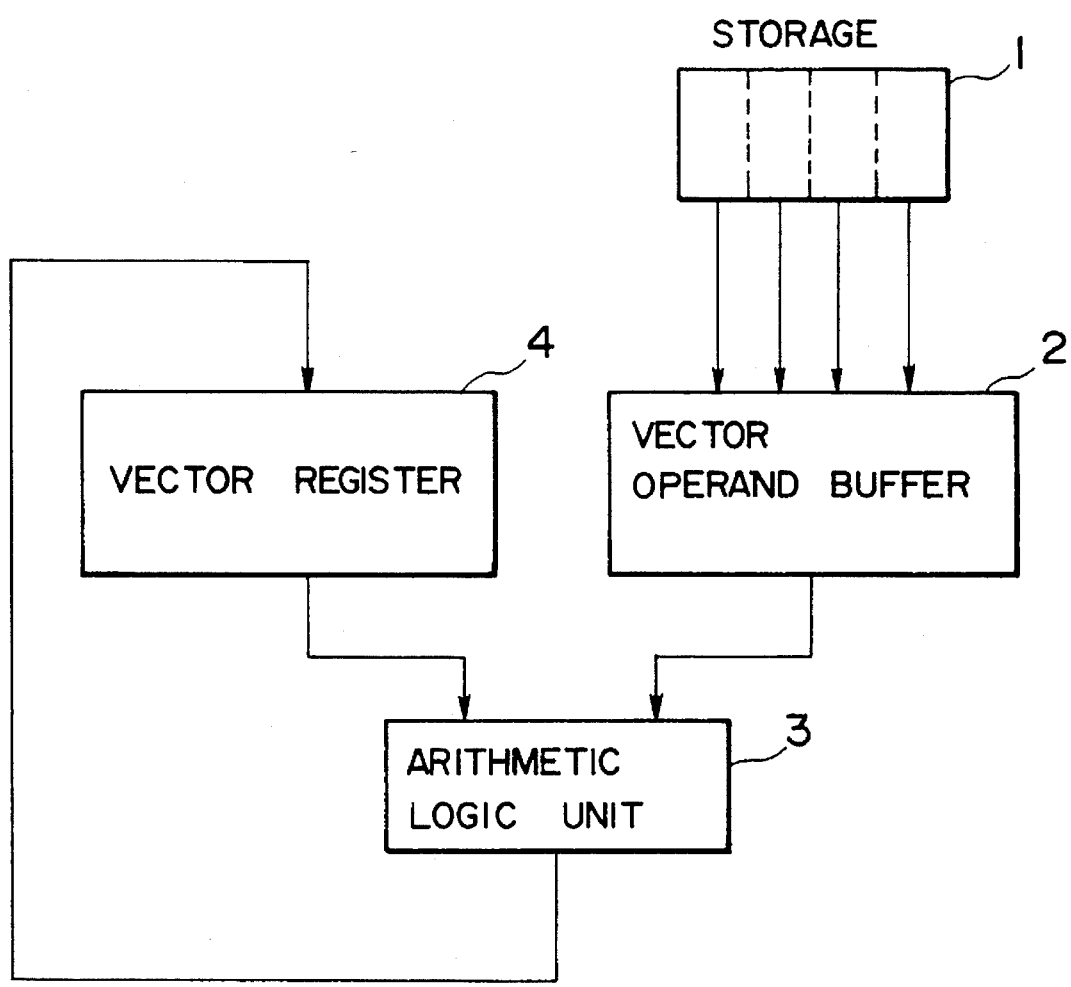
FIG. 1 is a block diagram of a system in which a vector operand buffer according to the present invention is adopted.

FIG. 1 is a block diagram of the essential portions of a vector data processor including a vector data buffer device to which the present invention is directed.

Referring to FIG. 1, the vector data processor is comprised of a storage area 1 which has four banks, a vector operand buffer 2 which has banks held in correspondence with the banks of the storage area 1, an arithmetic logic unit 3 which uses the content of the vector operand buffer 2 as input data, and a vector register 4 which stores the processed result of the arithmetic logic unit 3 and which affords other input data to the arithmetic logic unit 3.

It is crossbars (refer to FIG. 2) disposed in the vector operand buffer 2 that bring the banks of the buffer 2 into correspondence with those of the storage 1. Data items fetched from the storage 1 are rearranged by the vector operand buffer 2 into a sequence in which they are to be processed, whereupon they are sent to the arithmetic logic unit 3.

Meanwhile, in case where the storage 1 is accessed in order to fetch data items located at fixed intervals, such as arrayed data items, the correspondence between the sequence of issued requests and the banks (storage banks) of the storage 1 recurs at a certain period. Therefore, when the operand buffer 2 is divided into that number of banks which corresponds to the recurrence period, the data items directed toward entries included in the same bank of the operand buffer 2 arrive from the same storage bank each time.

In the operand buffer 2, the individual banks are connected to the storage banks which are determined by a head data address and an incremental value of data address on the main storage 1, in advance of the access to the main storage 1. When the data items arrive at the operand buffer 2, they are stored in the connected buffer banks in succession. At that time, the input data items are stored in locations of the buffer banks indicated by storing address generating logic circuits 15–18 (FIG. 2) which are disposed on the side of the buffer 2 for the respective banks of the main storage 1 in order to generate storing addresses of the buffer banks in which the input data items are to be stored upon receipt of the data items of these banks. Thus, even when the data items do not arrive in the sequence in which the requests were issued from the plurality of storage banks, they are stored in the operand buffer 2 with the normal sequence guaranteed.

Figure 2:
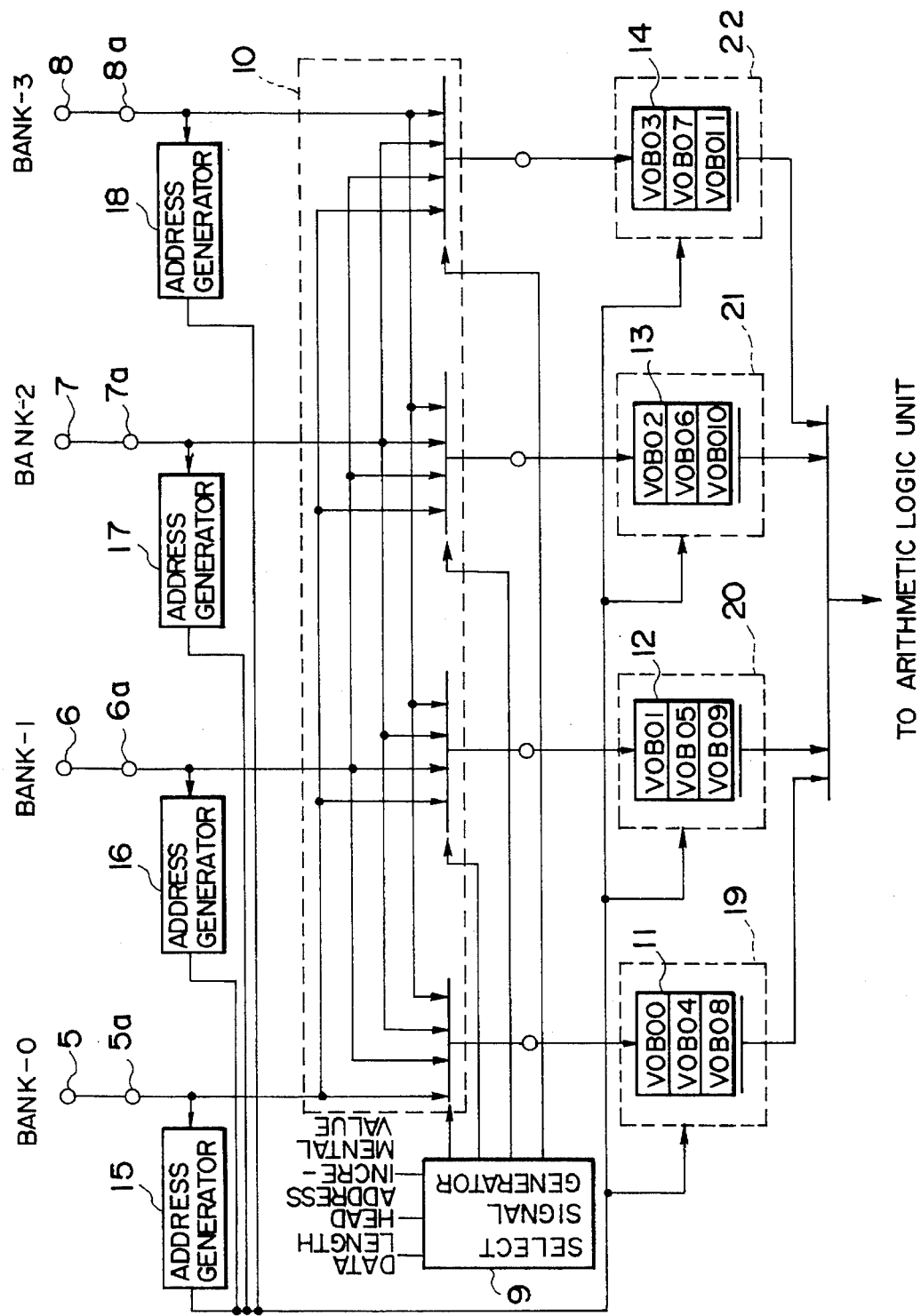
FIG. 2 is a block diagram of the vector operand buffer showing an embodiment of the present invention.

FIG. 2 is a block diagram of the whole arrangement of the vector operand buffer showing an embodiment of the present invention.

Referring to the figure, numerals 5–8 designate data terminals in the respective banks of the main storage. The vector operand buffer comprises input data terminals 5a–8a which correspond to the respective storing banks, a logic circuit 9 which generates select signals for all of the crossbars, a crossbar switch 10 which turns on or off under the control of the logic circuit 9, the banks 19–22 of this vector operand buffer, the aforementioned logic circuits 15–18 which generate the storing addresses, and buffer memories 11–14 which are included in the respective banks 19–22.

Figure 9:
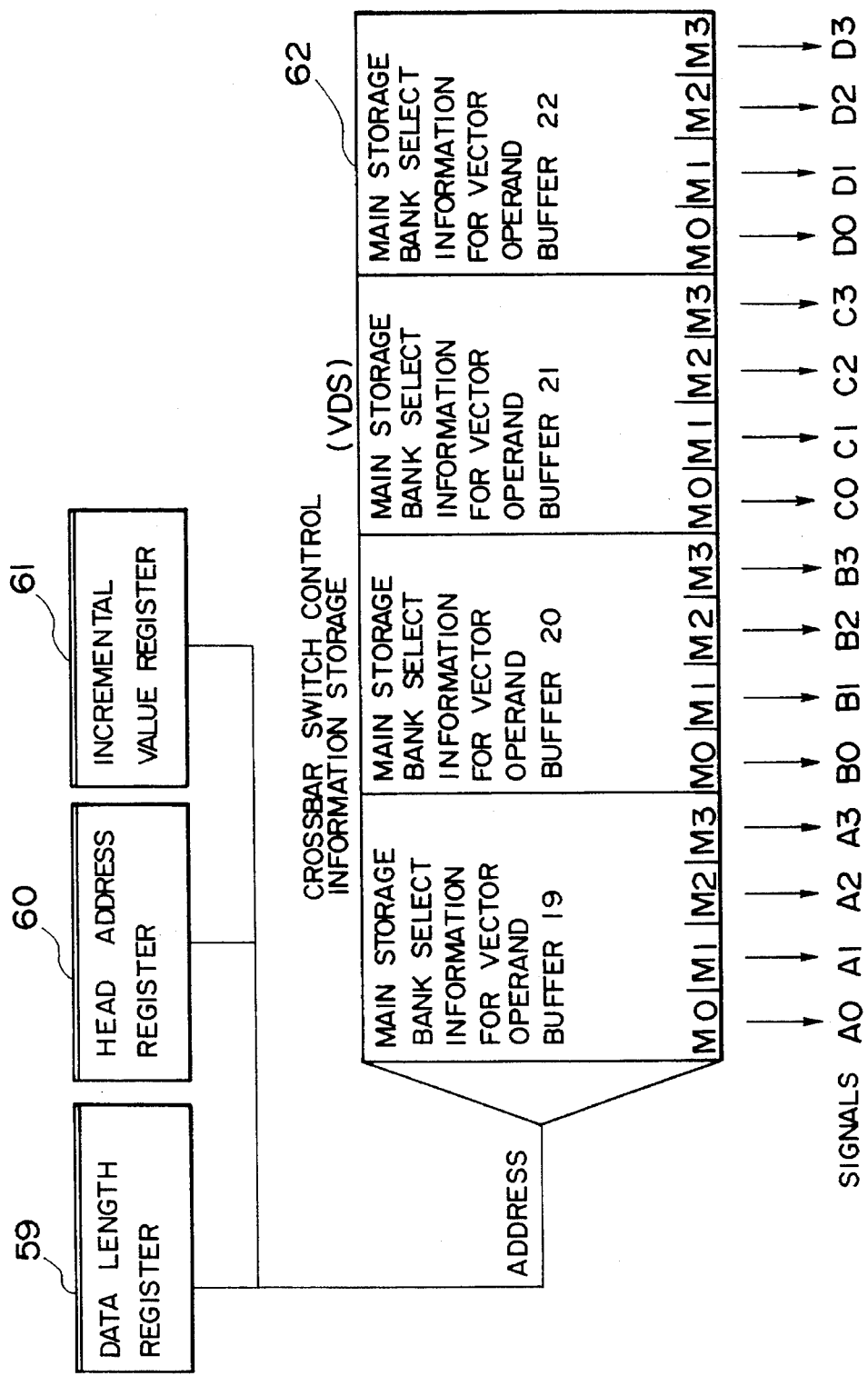
FIG. 9 is a block diagram of an example of a logic circuit which generates crossbar switch selecting signals in the embodiment of the present invention.

In addition, FIG. 9 shows an example of the logic circuit 9 for generating the crossbar select signals. Referring to the figure, the logic circuit 9 includes a data length holding register 59, a head address holding register 60, an incremental value holding register 61, and a crossbar switch control information storage or a vector-operand-buffer destination storage (hereinbelow, abbreviated to "VDS") 62.

The VDS 62 stores therein main storage bank select information items for the individual vector operand buffers 19, 20, 21, 22, and it supplies the corresponding individual crossbar switches and storing address generating logic circuits 15–18 with respective output data items which have been fetched using the held values of the registers 59, 60, 61 as addresses. Each crossbar switch connects any of the main storage bank-0 thru bank-3 to the associated vector operand buffer in accordance with the output data. When any of main storage bank select information items M0–M3 has become "1" in FIG. 9, the pertinent buffer bank is connected to the corresponding one of the main storage bank-0 thru bank-3.

Figure 10:
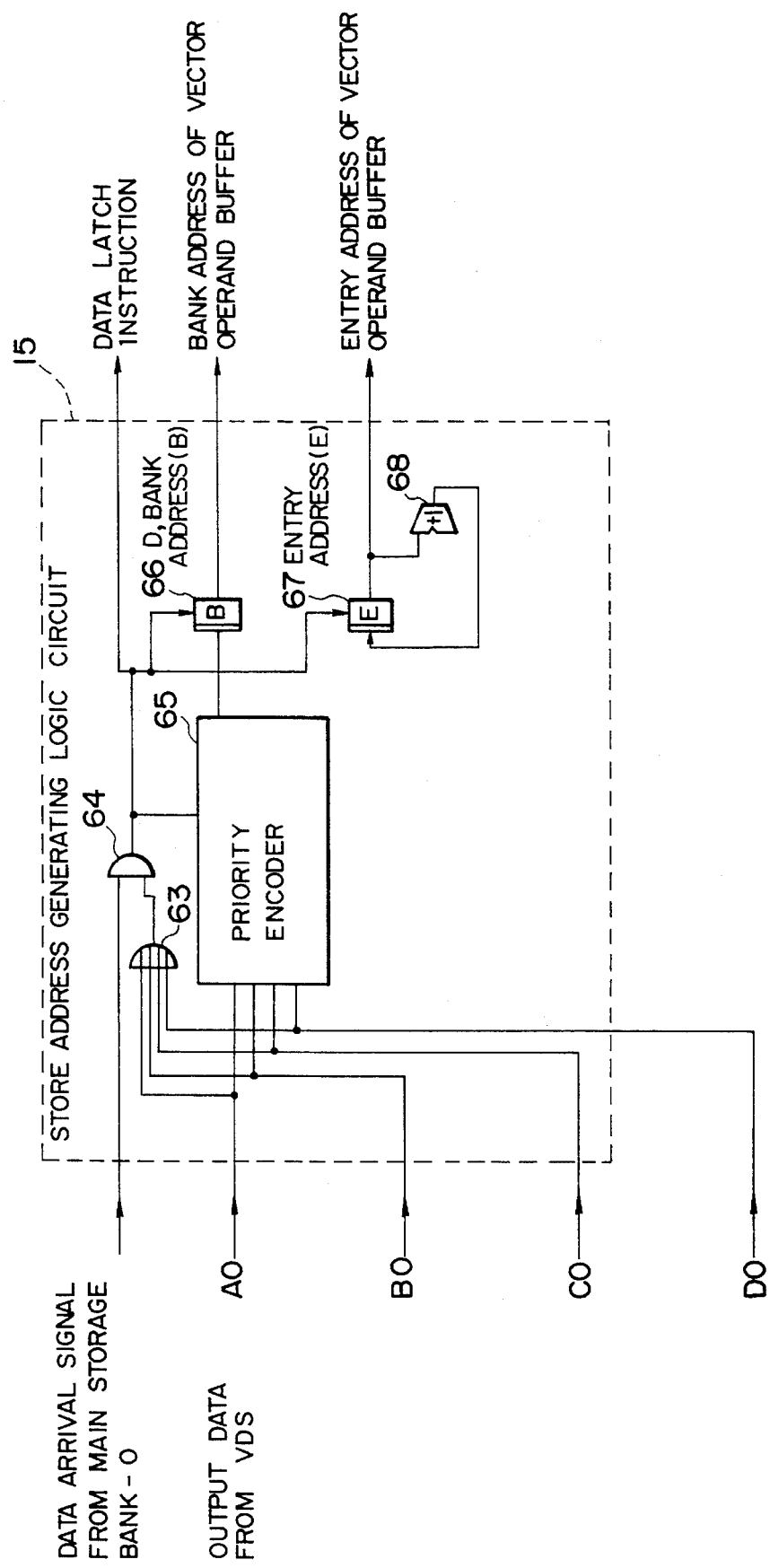
FIG. 10 is a block diagram of an example of a storing address generating logic circuit which is provided for each storing bank on the vector operand buffer side in the embodiment of the present invention.

FIG. 10 shows an example of the storing address generating circuit 15 for the main storage bank-0.

Referring to the figure, the input signals of the logic circuit 15 are a data arrival signal from the main storage bank 0 and signals A0, B0, C0, D0 being the output data items from the VDS 62. When the value of anyone of the respective VDS signals is "1" simultaneously with the data arrival signal, the associated one of the banks 19–22 of the vector operand buffer 2 is connected to the main storage bank-0. More specifically, the output of an OR circuit 63, which indicates that the main storage bank-0 is to be connected with at least one of the buffer banks, and the data arrival signal from the main storage bank-0 are subjected to an AND operation by an AND circuit 64, the output of which is delivered as a data latch signal. In addition, the signals A0, B0, C0, D0 are input to a priority encoder 65, and the bank address of the vector operand buffer delivered as an output from the priority encoder 65 is set in a D. bank address (B) 66, while at the same time, the content of an entry address (E) 67 is updated so as to be incremented by 1. An adder 68 is a circuit which counts up from zero to the maximum entry address and laps around to zero.

Referring back to FIG. 2, when the data is sent from any of the respective data terminals 5–8 of the banks-0–3 of the main storage to arrive at the crossbar switch 10 of the vector operand buffer, the crossbar switch 10 is operated by the control signals delivered from the logic circuit 9 storing the head address and the incremental value, and thus the input data is assigned to one of the banks 19–22 each being divided into blocks.

Within the banks 19–22, the input data is stored in the buffer memories 11–14 designated by the storing address generating logic circuits 15–18.

Figure 3:
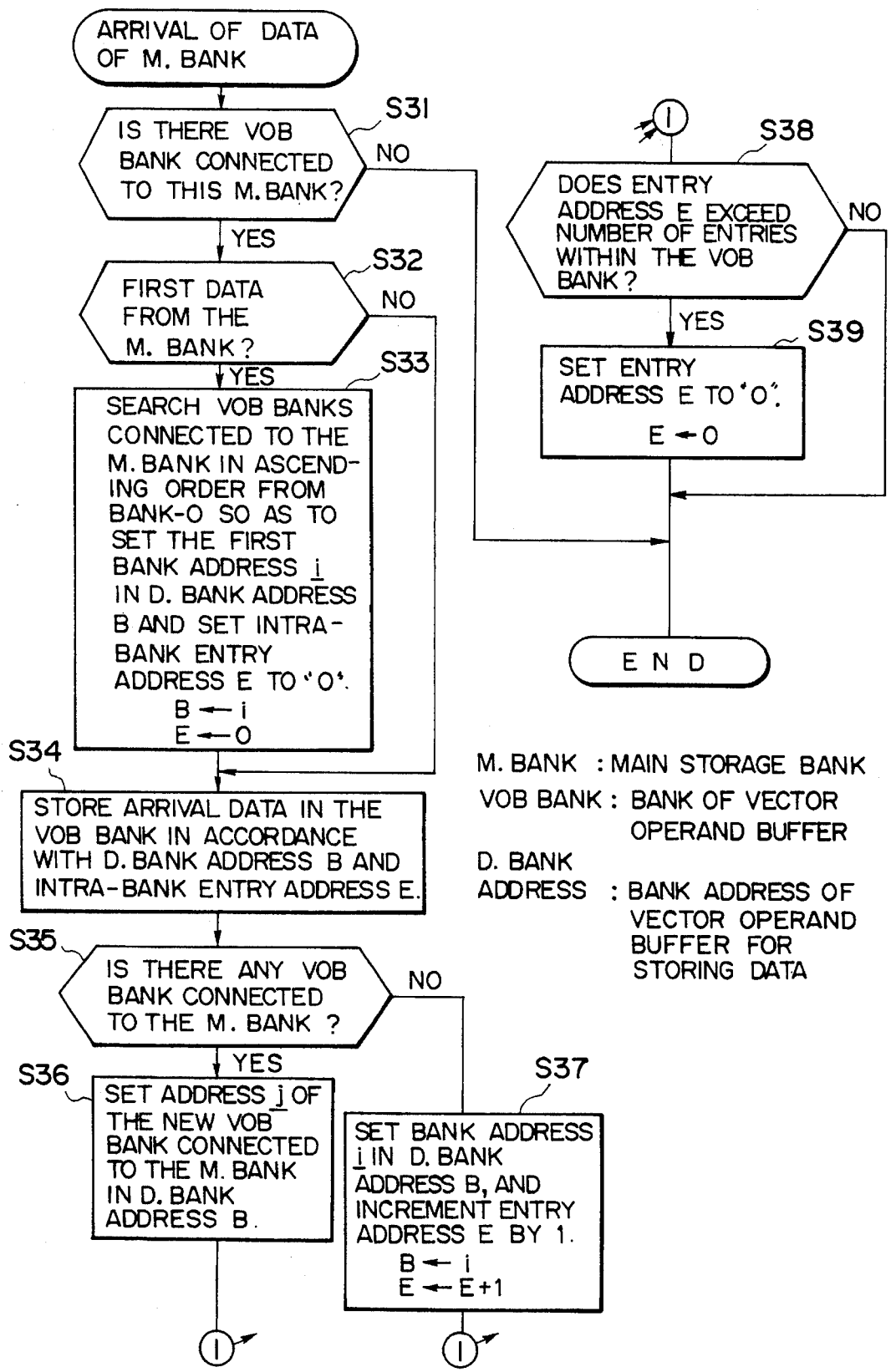
FIG. 3 is a flow chart of the function of the storing address generating logic.

FIG. 3 shows the functional flow chart of each of the storing address generating logic circuits 15–18. This flow commences upon the arrival of the data of the storage bank or memory bank to which the logic circuit is connected.

When the data arrives from the pertinent storing bank, it is determined whether or not there is any vector operand buffer (VOB) bank connected to this storage bank (S31). In the absence of the VOB bank, the processing flow ends, and in the presence thereof, it is determined whether or not the data is the first one from the pertinent storage bank (S32). When the data is not the first one, the processing flow proceeds to a step S34. On the other hand, when it is the first data, the buffer banks connected to the pertinent storage bank are searched in ascending order from the VOB bank-0 so that the bank address i of the first buffer bank connected to the pertinent storage bank may be set in the D. bank address B (66 in FIG. 10) and that the intra-bank entry address E (67) may be set to "0" (S33). Next, the data is stored in the operand buffer in accordance with the D bank address B and the intra-bank entry address E (S34). Subsequently, it is determined whether or not any buffer bank connected to the pertinent storage bank exists in a section from the next bank to the bank of the above D. bank address B up to the last bank of the operand buffer (S35). When such buffer bank exists, the address i of the next connected buffer bank is set in the D bank address B (S36), and when it does not exist, the bank address i is set in the D bank address B, and the entry address E is incremented by one (S37). Thereafter, it is determined whether or not the entry address E exceeds the number of entries within the buffer bank (S38). When the number of entries is not exceeded, the processing ends. On the other hand, when it is exceeded, the entry address E is set to "0" (S39), whereupon the processing ends.

As a result of the above operations, the arriving data items are stored in the associated buffer locations, and the vector operand buffer 2 is made ready for the arrival of the next data.

Thus, the data items having arrived from the main storage 1 can be simultaneously stored in the buffer memories 11–14 because the four banks 19–22 operate independently.

Figure 4:
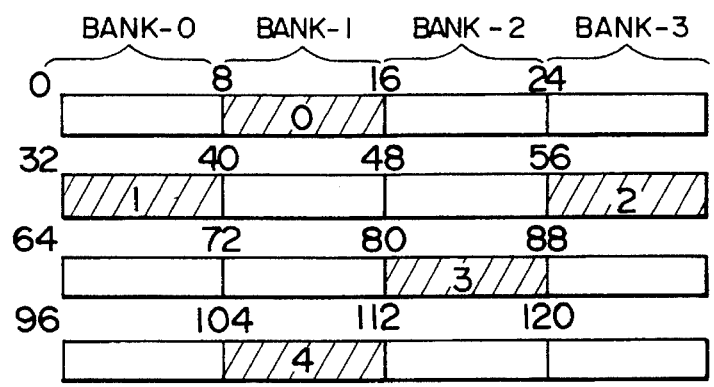
FIG. 4 is a diagram showing the assignment of the banks of a main storage and the arrangement of 8 byte data items.

FIG. 4 shows an example of the data array in which 8 bytes are assigned to each bank on the main storage side.

Referring to the figure, the main storage area is divided into sections bordered every 32 bytes, and each of the sections is subdivided into 4 areas each being 8 bytes long, thereby establishing the bank-0, bank-1, bank-2 and bank-3 as reckoned from the head of the main storage bank. In this example, data-0 (8–16) is assigned to the bank-1 by the request of an instruction processor, data-1 (32–40) to the bank-0, data-2 (56–64) to the bank-3, data-3 (80–88) to the bank-2, and data-4 (104–112) to the bank-1. The head address of this data array is address-8, and an incremental value (period) from the head address-8 to the next head address-32 of the bank having the data assigned thereto is 3× 8 bytes=24 bytes. Regarding the assignment of the data array in the main storage, the correspondence having a fixed incremental value between the banks and the data items exhibits a certain repeating property in this manner. In the case of the embodiment in FIG. 2, the data length of 8 bytes, the head address of the address-8 and the incremental value of 24 bytes are stored in the crossbar logic circuit 9 beforehand, thereby assigning the data 0 to the bank 1, the data-1 to the bank-0, the data-2 to the bank-3, the data 3 to the bank-2, and the data-4 to the bank-1. Accordingly, even when the regular sequence of the arrayed data items fetched from the plurality of storage banks is not ensured, the respective data items are independently input from the storage banks to the corresponding banks of the operand buffer and are stored in the buffer memories therein having the same Nos. as the data item Nos. without fail.

Now, vector elements are numbered 0, 1, 2, 3, . . . beginning with the first vector element. The head address of a vector (the address of the 0-th element) is denoted by A, while the incremental value of the vector elements is denoted by INC.

Then, the following equations (1) and (2) may hold in order that, as to the 0-th and n th vector elements, the addresses of the main storage to be accessed may coincide in modulo 32:

$$A + INC \times n = A + 32 \times m \qquad (1)$$

$$INC \times n = 32 \times m \qquad (2)$$

Here, m indicates an arbitrary constant. In a case where, in Eqs. (1) and (2), one vector element is composed of 8 bytes and the incremental value INC is expressed as INC= $8 \times \Delta (\Delta = 0, \pm 1, \pm 2, \ldots )$, the following equation holds:

$$\Delta \times n = 4 \times m \qquad (3)$$

When Δ is an arbitrary integer, the minimum value of n satisfying Eq. (3) is 4. Accordingly, the access pattern of the banks repeats every fourth element.

More specifically, when the vector elements are grouped into four sets; {0, 4, 8, 12, ... }, {1, 5, 9, 13, ... }, {2, 6, 10, 14, ... } and {3, 7, 11, 15, ... }, the elements within each of the sets receive the data items from the identical bank. In this manner, in the case where the data sections of the storage area are bordered every 32 bytes and where each vector element is composed of 8 bytes, every periodic 8 byte-data items spaced apart from each other in the main storage are input from the same banks, respectively, by dividing the vector operand buffer into 4 banks, 8 banks, 12 banks, ...

In general, the number of banks of the vector operand buffer can be determined on the basis of the number of the storage banks, the data width of each of the storage banks, and the data width of each of the arrayed data items.

Since the regular sequence of data items is guaranteed within one storage bank, the data items arriving from the storage bank are allowed to be successively stored in one specified bank of the buffer memory. In addition, as will be stated later, data storing areas are previously endowed with a regular sequence even among a plurality of buffer banks.

Figure 5:
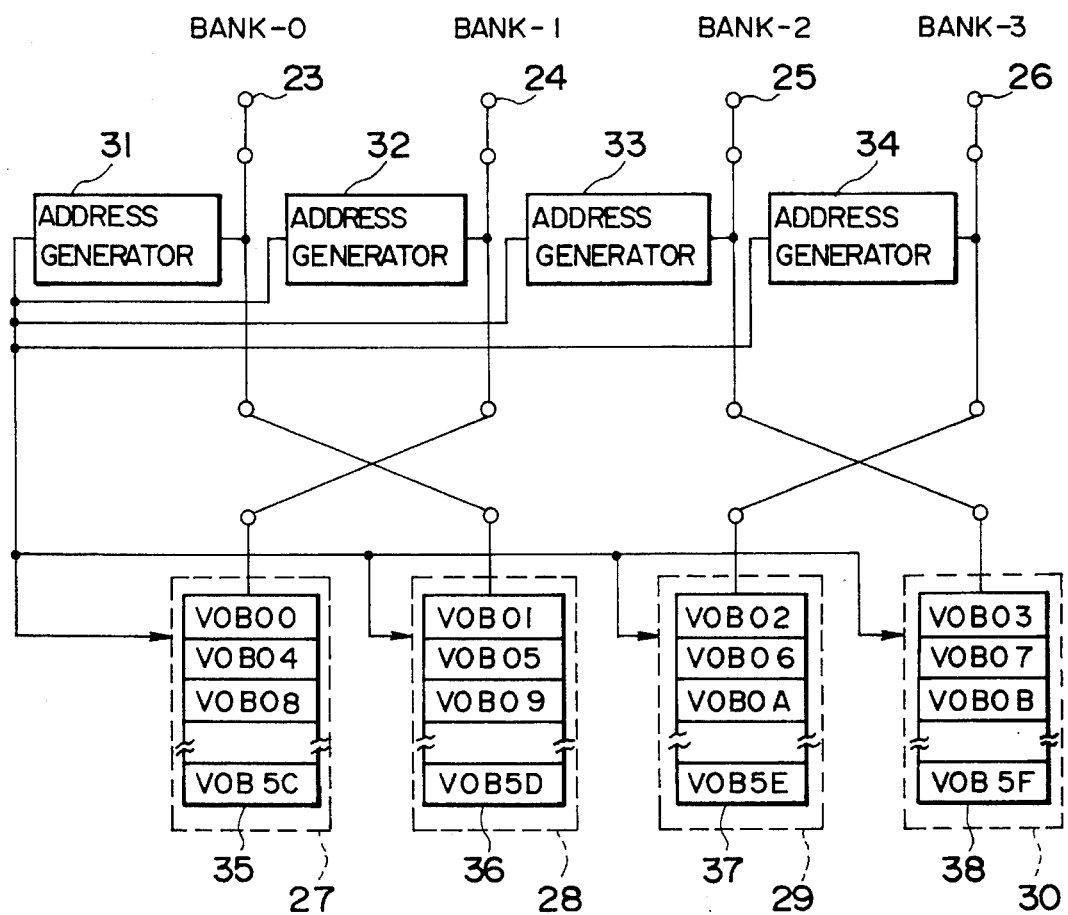
FIG. 5 is a diagram showing the corresponding arrangement of a the banks in FIG. 4 and the vector operand buffer.

FIG. 5 is a diagram showing the corresponding relationship between the storage banks of a main storage and the banks of a vector operand buffer with regard to the sets of 8-byte data items.

Referring to FIG. 5, numerals 23–26 designate data output terminals in the storage banks-0–3, respectively. The vector operand buffer comprises banks 27–30, storing address generating logic circuits 31–34 which are disposed for the respective storage banks-0–3, and buffer memories 35–38 which are included in the respective operand buffer banks 27–30.

The construction in FIG. 5 corresponds to the data array of FIG. 4. Data Nos. 1, 5, 9, ... are sent from the bank-0 on the storage side, data Nos. 0, 4, 8, ... from the bank 1, data Nos. 3, 7, 11, 15, ... from the bank 2, and data Nos. 2, 6, 10, 14, ... from the bank-3. In conformity with this situation, the data storing areas of the banks 27–30 of the vector operand buffer are endowed with a regular sequence beforehand. More specifically, the data storing areas VOB00–VOB03 are respectively assigned to the head addresses of the banks 27–30 in the sequence of initial requests, and the data storing areas for the succeeding requests are successively assigned to the next addresses of the banks 27–30. In the example of FIGS. 4 and 5, on the side of the vector operand buffer, the respective banks 27–30 are connected with the specified bank terminals 23–26 of the storage side by crossbar switches before the data items are fetched. That is, the storing bank-0 is connected to the buffer bank 28, the storing bank-1 is connected to the buffer bank 27, the storing bank-2 is connected to the buffer bank 30, and the storing bank-3 is connected to the buffer bank 29. In this manner, the divided banks 27–30 of the operand buffer are brought into correspondence with the banks-0–3 of the storage. As intended, accordingly, the buffer memory 35 of the bank 27 stores the data items requested 0-th, 4th, 8th, ..., the buffer memory 36 of the bank 28 stores the data items requested 1st, 5th, 9th, ..., the buffer memory 37 of the bank 29 stores the data items requested 2nd, 6th, 10th, ..., and the buffer memory 38 of the bank 30 stores the data items requested 3rd, 7th, 11th, ....

In this way, after the buffer banks 27–30 have been connected with the specified bank terminals 23–26, the arriving data items may be stored in the locations indicated by the destination address generating logic circuits 31–34 which are disposed for the respective storage banks.

In the case where a requester has requested the storage bank-1 to deliver the data-0 and the storage bank-0 to deliver the data-1 even if the data-1 of later request issue is fetched from the bank-0 earlier than the fetch of the data-0 of the earlier request issue from the bank-1, the requester will not erroneously recognize the data-1 as the data-0 complying with the preceding request because it understands that the data-0 will be stored in the buffer bank 27.

Figure 6:
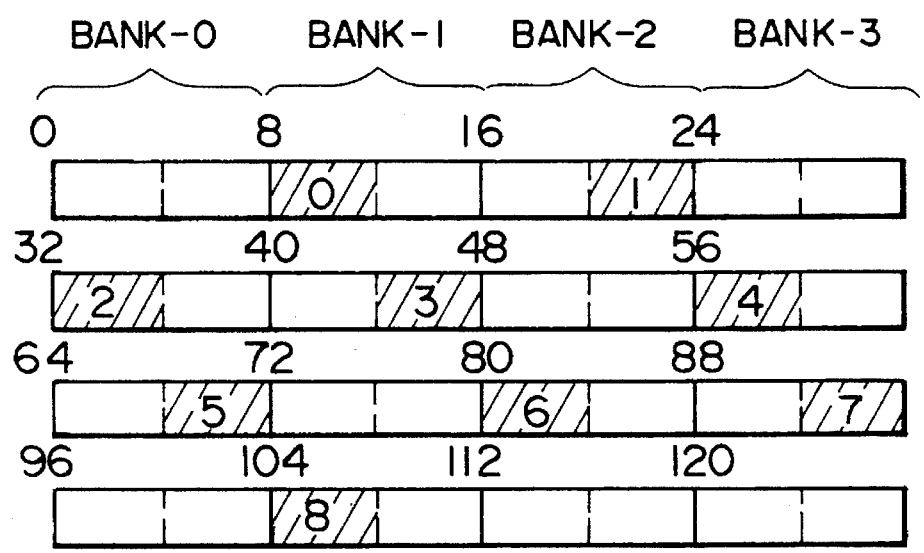
FIG. 6 is a diagram showing the assignment of the banks of a main storage and the arrangement of 4-byte data items.
Figure 7:
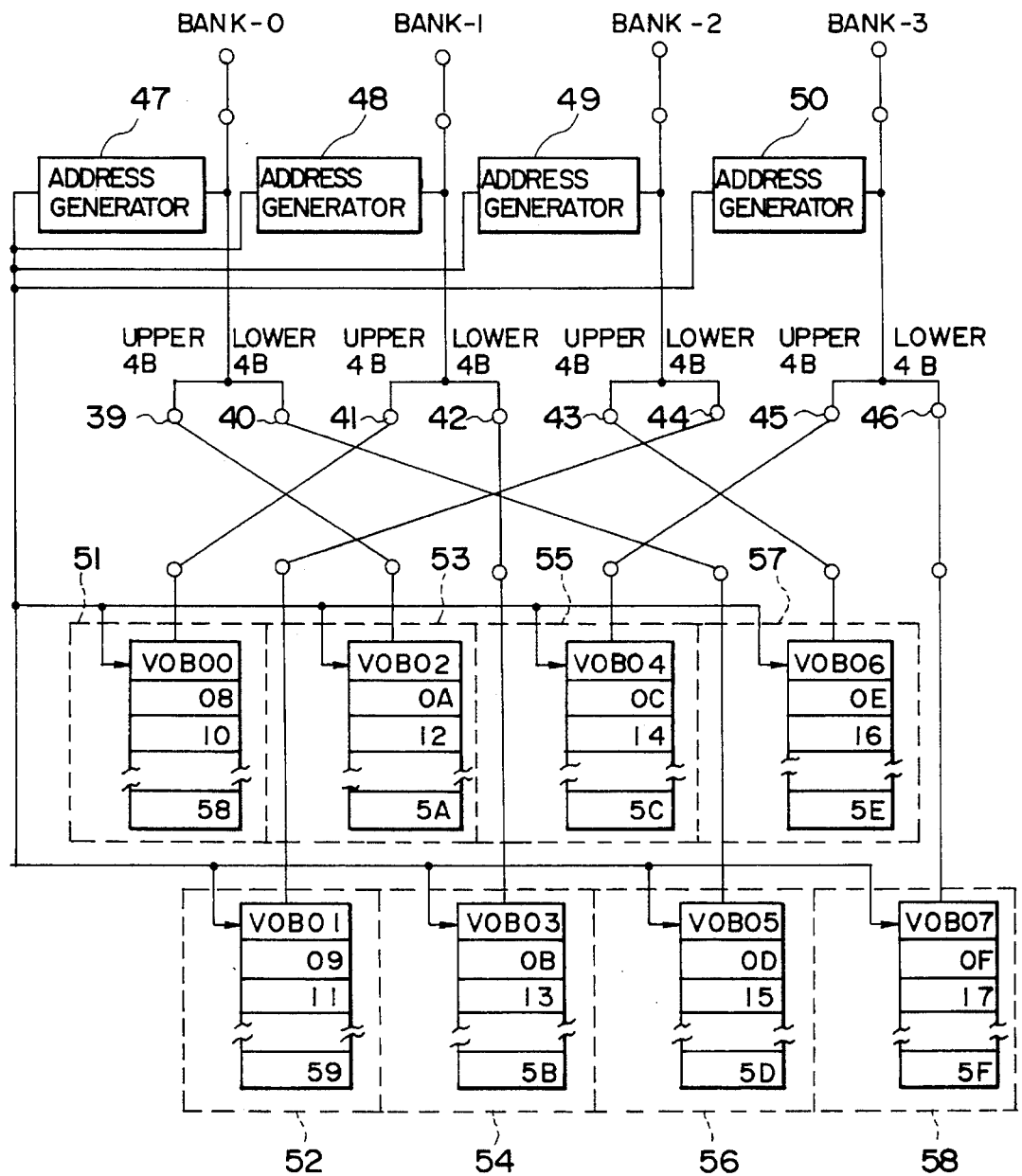
FIG. 7 is a diagram showing the corresponding arrangement of the banks in FIG. 6 and a vector operand buffer.

FIG. 6 is a diagram of a data array in the main storage showing another embodiment of the present invention, and it exemplifies the arrayal of 4-byte data items. FIG. 7 is a diagram of the connection of the storage and the vector operand buffer in the case of FIG. 6.

Here, the optimum number of divided banks for the 4-byte data items will be discussed. Eq. (2) mentioned before will be used again.

$$INC \times n = 32 \times m \tag{2}$$

In Eq. (2), INC denotes the incremental value which is equal to (the number of bytes of a vector element)×Δ, n denotes the number in a sequence in which the storage has been accessed, and m denotes an arbitrary integer. Assuming now that the vector element is composed of 4 bytes, INC= 4×Δ holds, and hence, Eq. (2) is reduced to the following equation:

$$\Delta \times n = 8 \times m (\Delta = 0, \pm 1, \pm 2, \dots) \tag{4}$$

The minimum value of n meeting Eq. (4) is 8. Accordingly, banks on the storage recur every 8th 4-byte data item.

In the case of the storage configured of four banks, when each of the banks is connected to two buffer banks as illustrated in FIG. 6, data items destined to be entries within the same banks of the vector operand buffer arrive from the same banks of the storage in such a way that the head address of address-8 and the incremental value of 12 bytes are stored in a crossbar logic circuit.

In FIG. 7, the vector operand buffer is divided into eight banks 51–58. The correspondence among the storage banks and the buffer banks is for the case of the data array at the type shown in FIG. 6. Here, as the arrayal which affords the regular sequence of the banks of the vector operand buffer, bank Nos. are first disposed vertically from a left upper position and subsequently disposed rightwards in succession. That is, the bank 51 is set as bank No. 0, the bank 52 as bank No. 1, the bank 53 as bank No. 2, the bank 54 as bank No. 3, ... As shown in FIG. 7, accordingly, the bank No. 2 (namely, the bank 53) of the vector operand buffer is connected to a terminal 39 for the upper 4 bytes sent from the storing bank-0, while the bank No. 5 (namely, the bank 56) of the buffer is connected to a terminal 40 for the lower 4 bytes sent from the same storing bank. The bank No. 0 (namely, the bank 51) of the buffer is connected to a terminal 41 for the upper 4 bytes sent from the bank-1, while the bank No. 3 (namely, the bank 54) of the buffer is connected to a terminal 42 for the lower 4 bytes sent from the same storing bank. The other buffer banks are similarly connected to terminals 43–46 in succession. Numerals 47–50 designate logic circuits which are disposed for the respective storage banks in order to generate the storing addresses of the operand buffer.

When arithmetic operations are started, the operands stored in the vector operand buffer are successively derived from buffer memories VOB00–VOB5F and sent to an arithmetic logic unit.

Furthermore, in a case where the arrayed data items of 8 byte width as shown in FIG. 4 are dealt with in addition to those of 4-byte width as in this embodiment, the construction in FIG. 7 may be adopted for a vector operand buffer device. In order to deal with the data items of 8-byte width, two buffer banks of consecutive Nos. are assigned to an identical storage bank, whereby processing equivalent to that of the construction in FIG. 5 can be executed. In the case of dealing with only arrayed data items of a fixed data width, the data length of the arrayed data need not be contained as the information for generating the crossbar switch select signals as illustrated in FIGS. 2 and 9.

The above embodiments have referred to the vector operand buffers each fetching the 8-byte or 4-byte data items from the storage area which is configured of the four banks, each of 8-byte width. However, even when the construction of the storage area and the width of data to be fetched differ from the foregoing, the present invention is applicable quite similarly.

Figure 8:
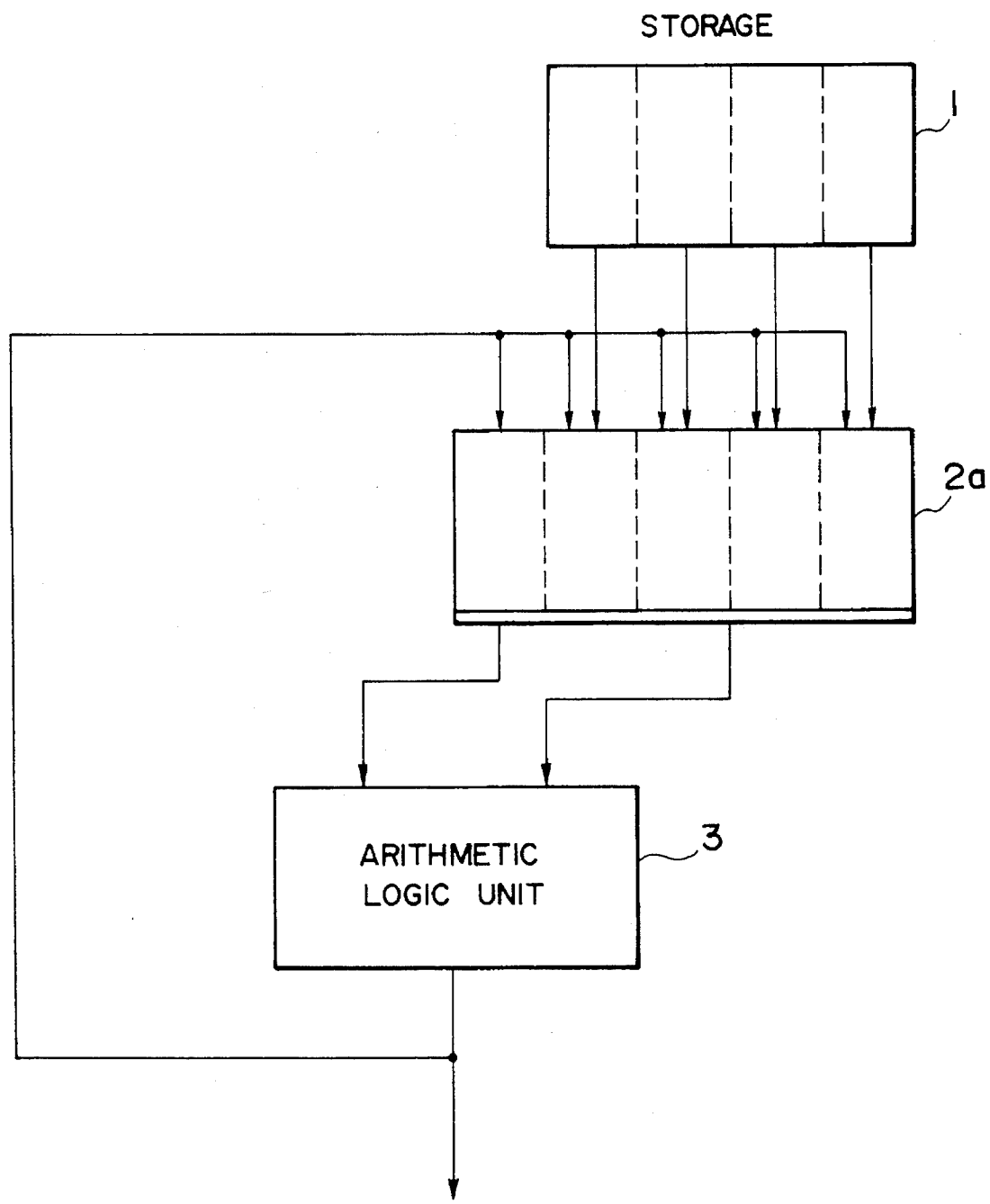
FIG. 8 is a connection diagram of a vector operand buffer showing another embodiment of the present invention.

FIG. 8 is a diagram explanative of the method of use of a vector operand buffer showing still another embodiment of the present invention.

In the illustrated embodiment, the vector operand buffer 2a is used, not only as an original functional circuit, but also as a vector register. Accordingly, the vector register 4 in FIG. 1 is removed, and the output data line of an arithmetic logic unit 3 is connected to the input side of the vector operand buffer 2a, while input data lines leading to the arithmetic logic unit 3 are also connected to the output side of the vector operand buffer 2a. In this case, among the n banks of the vector operand buffer 2a, m banks are used as the vector operand buffer, and the remaining (n–m) banks are used as the vector register.

As thus far described, the present invention is very effective when applied to a system wherein successive data items at fixed intervals are fetched from a storage area comprised of a plurality of storing banks capable of independent operations and are stored in a high-speed buffer. The present invention utilizes the fact that a repeating property is involved in the correspondence between the banks and data request Nos. Accordingly, the banks of the storage and those of the buffer are previously brought into correspondence and connected by means of crossbar switches by storing a head address and an incremental value, without affixing the request Nos. or the like information items to the requests. Thus, the four banks of the storage independently write the data items into the operand buffer endowed with a regular sequence beforehand, so that the data items have the sequence guaranteed to be the sequence in which they have been stored in the operand buffer.

As described above, according to the present invention, a vector operand buffer device in which the regular sequence of fetched arrayed data items is ensured can be realized without increasing the quantity of hardware on the storage area side.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A method of storing data in a vector data buffer which receives a plurality of arrayed data items fetched from a storage, said storage including a plurality of independently operating storage banks and said storage having stored therein the plurality of arrayed data items, said method comprising the steps of:

constructing said vector data buffer out of a plurality of bank memories which conform to a corresponding periodic relationship between said plurality of arrayed data items and said independently operating storage banks;

presetting data storing areas for storing said plurality of arrayed data items, on successively different bank memories of said vector data buffer in a sequence in which individual arrayed data items have been requested;

connecting individual storage banks in said sequence in which said plurality of arrayed data items have been requested, to said successively different bank memories, respectively, wherein each of said plurality of bank memories receives said plurality of arrayed data items only from a corresponding one of said plurality of storage banks during processing of a request for fetching said plurality of arrayed data items; and successively, in said sequence in which the individual data items have been requested, storing individual ones of said plurality of arrayed data items fetched from said individual storage banks included in said storage, in corresponding ones of the plurality of bank memories.

2. A vector data buffer device which receives a plurality of arrayed data items fetched from a storage, said storage including a plurality of independently operating storage banks and said storage having stored therein the plurality of arrayed data items, comprising:

a vector data buffer which stores therein said arrayed data items fetched from said storage, said vector data buffer includes a plurality of bank memories in a predetermined number, said predetermined number being determined based on a combination of a number of said storage banks, a data width of each of said independently operating storage banks and a data width of each of said plurality of arrayed data items;

switch means for connecting individual bank memories of said plurality of bank memories of said vector data buffer to respective ones of said independently operating storage banks;

switch control means for dynamically changing connection relationships of said switch means on the basis of, at least, a storage address and data intervals of said plurality of arrayed data items wherein any one of said plurality of bank memories which receives data items from one of said plurality of storage banks may not receive data items from another of said plurality of storage banks during processing of a request for fetching said plurality of arrayed data items; and storing address generation means for generating entry addresses within said plurality of bank memories in which said plurality of arrayed data items fetched are to be stored.

3. A vector data buffer device according to claim 2, wherein the predetermined number of said plurality of bank memories of said vector data buffer is set to be n (integer) times larger than said number of said storage banks, while data width of each of said storage banks is set to be n times larger than the data width of each of said plurality of bank memories, and n bank memories of said plurality of bank memories are simultaneously connected to a corresponding one of said independently operating storage banks.

4. A vector data processor comprising:

a main storage which includes a plurality of independently operating storage banks;

a vector data buffer device for receiving a plurality of arrayed data items fetched from said main storage, including:

a vector data buffer which stores therein said plurality of arrayed data items fetched from said main storage, said vector data buffer includes a plurality of bank memories in a predetermined number, said predetermined number being determined based on a combination of a number of said independently operating storage banks, a data width of each of said storage banks and the data width of each of said plurality of arrayed data items, switch means for connecting the individual bank memories of said plurality of bank memories of said vector data buffer to any of said storage banks, switch control means for dynamically changing connection relationships of said switch means on the basis of, at least, a storage address and data intervals of said plurality of arrayed data items wherein any one of said plurality of bank memories which receives data items from one of said plurality of storage banks may not receive data items from another of said plurality of storage banks during processing of a request for fetching said plurality of arrayed data items, and storing address generation means for generating address information items which indicate the bank memories of said data buffer for storing said arrayed data items which are fetched from the individual storing banks, as well as entry addresses within said plurality of bank memories in which said plurality of arrayed data items fetched are to be stored;

arithmetic means for successively deriving and processing said plurality of arrayed data items stored in said vector data buffer device; and a vector register for storing a processed result of said arithmetic means therein.

5. A vector data processor according to claim 4, wherein said vector data buffer device serves also as said vector register.

* * * * *